(12) United States Patent
Hu et al.

(10) Patent No.: US 7,488,137 B2
(45) Date of Patent: Feb. 10, 2009

(54) SANITARY HUB ASSEMBLY AND METHOD FOR IMPELLER MOUNTING ON SHAFT

(75) Inventors: Xiaobing Hu, Rochester, NY (US); Anthony C. Kocienski, Rochester, NY (US)

(73) Assignee: SPX Corporation, Charlotte, NC (US)

( * ) Notice: Subject to any disclaimer, the term of this patent is extended or adjusted under 35 U.S.C. 154(b) by 140 days.

(21) Appl. No.: 11/024,487

(22) Filed: Dec. 30, 2004

(65) Prior Publication Data

US 2006/0147259 A1    Jul. 6, 2006

(51) Int. Cl.
*B25G 3/20* (2006.01)

(52) U.S. Cl. ............ 403/374.4; 403/288; 277/622

(58) Field of Classification Search ......... 403/367–371, 403/374.1, 374.3, 238–239, 202–204, 288; 416/244 R, 244 A, 213 R, 213 A; 277/622, 277/625; 285/351, 352
See application file for complete search history.

(56) References Cited

U.S. PATENT DOCUMENTS

| | | | | |
|---|---|---|---|---|
| 738,445 A * | 9/1903 | Hoffmann | ............ | 384/540 |
| 2,974,502 A * | 3/1961 | Radcliffe | ............ | 464/89 |
| 3,307,634 A * | 3/1967 | Bihlmire | ............ | 416/135 |
| 3,321,024 A * | 5/1967 | Marconi, Jr. | ............ | 416/135 |
| 3,526,467 A * | 9/1970 | Kime | ............ | 416/200 R |
| 3,695,642 A * | 10/1972 | DeWoody | ............ | 285/148.3 |
| 4,407,533 A * | 10/1983 | Giebeler | ............ | 285/281 |
| 4,824,281 A * | 4/1989 | Katsube | ............ | 403/369 |
| 4,842,483 A * | 6/1989 | Geary | ............ | 416/93 A |
| 4,993,151 A * | 2/1991 | Steiner et al. | ............ | 29/889.6 |
| 5,649,780 A * | 7/1997 | Schall | ............ | 403/109.4 |
| 5,695,297 A * | 12/1997 | Geib | ............ | 403/371 |
| 6,332,734 B1 * | 12/2001 | Hebert | ............ | 403/371 |
| 2005/0220534 A1 * | 10/2005 | Ober | ............ | 403/370 |

* cited by examiner

*Primary Examiner*—Daniel P Stodola
*Assistant Examiner*—Joshua T Kennedy
(74) *Attorney, Agent, or Firm*—Baker & Hostetler LLP

(57) ABSTRACT

A hub for removable mounting onto a shaft has an inner sleeve having a first end and a second end, and having a substantially cylindrical inner diameter and having an outer surface having a threaded region and a tapered conical surface located substantially near the first end. An outer hub has an inner surface with a threaded region threadably engagable with the threaded region of the inner hub, and a inner tapered conical surface configured to cam along the tapered outer surface of the inner hub. The hub can be locked at a desired axial location or the shaft by engaging the threads to cause the cam surfaces to constrict the diameter of the first end so it frictionally locks onto the shaft.

6 Claims, 2 Drawing Sheets

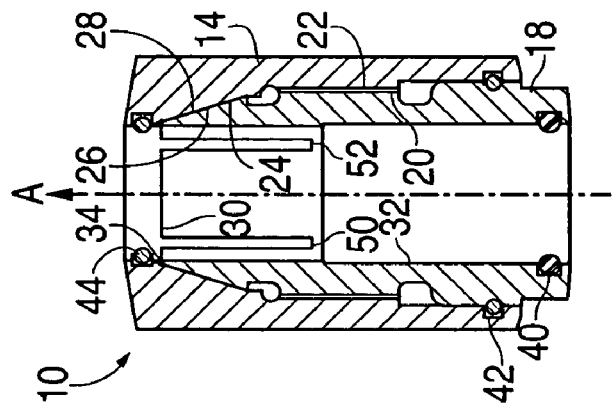
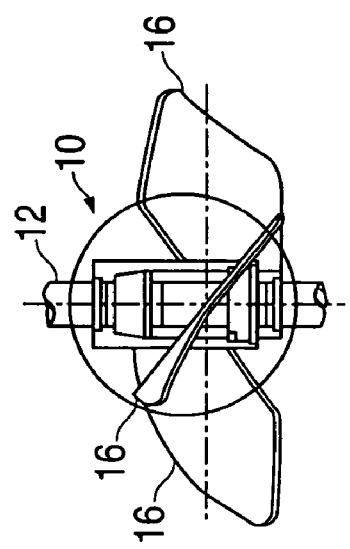
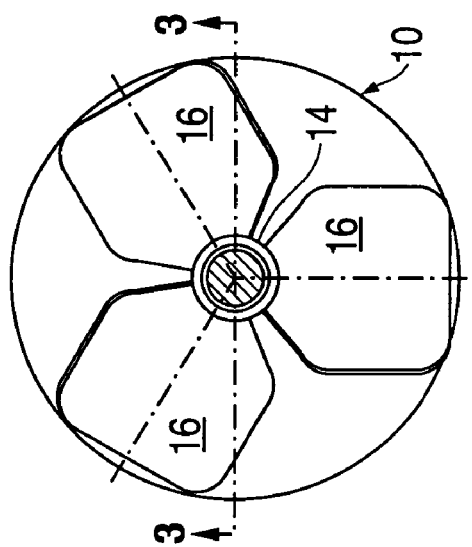

SANITARY HUB ASSEMBLY AND METHOD FOR IMPELLER MOUNTING ON SHAFT

FIELD OF THE INVENTION

The present invention relates generally to the field of hubs that are mounted onto a rotating shaft, for example, hubs that support impellers that are mounted to a rotating mixer shaft. More particularly, the present invention relates to hubs that are removably mounted onto a mixer shaft.

BACKGROUND OF THE INVENTION

Mixing devices are in wide use in industry, and many mixing devices typically include a vessel, which contains a liquid or other material to be mixed, and an impeller shaft running through some or all of a length inside the vessel. The impeller shaft is typically rotatibly driven by a motor, often located at the top of the vessel. There are radially extending impellers, which are mounted to the shaft at one or several axial locations on the length of the shaft and are in the form of paddles or blade type features that extend radially outward from the shaft. The impellers mix and or otherwise impart energy to the material inside of the vessel when the shaft is rotated.

Mixing devices of this type are in wide use, for example in the pharmaceutical, biotechnology, and sanitary food and beverage industries. These industries sometimes present several requirements, which it would be desirable to have met. For example, it is often desirable to be able to change or switch out the shape or size of the impeller being used to permit use of an impeller that will accomplish the desired goals with the material that is to be mixed. For this reason, it would be desirable to have an impeller hub that can be removably mounted on to the shaft, thereby permitting interchanging of different hub impeller arrangements on to a single standard shaft.

Another requirement often found in these industries is easy cleanability and maintenance of sanitary conditions before, during and after mixing. Some known disassemblable hub mounting arrangements can present the problem that during operation the material comes in contact with complex surfaces which are then difficult to clean. For example, known hubs may have exposed screws or numerous gaps that can collect dirt or material. Accordingly, it would be desirable to have a removable impeller hub system that maintains sanitary conditions during operation and easy cleanability before or after use.

Another desirable characteristic in mixers, in addition to being able to interchange different impeller shapes and sizes, is the ability to change the axial location of the impeller hub. Therefore, it would also be desirable to have a removable impeller assembly that provides for axial adjustment if desired.

It would further be desirable to have such an impeller and hub assembly that is economical, requires a relatively few number of parts, and that can be simple to install and uninstall.

SUMMARY OF THE INVENTION

The foregoing needs are met, to a great extent, by the present invention, wherein in one aspect of an apparatus and method is provided that in some embodiments can be easily mounted onto a shaft at the desired axial location, and adjusted to a different axial location and/or removed entirely when desired, and which is easy to clean.

In accordance with one aspect of the present invention, a hub assembly for removable mounting onto a shaft comprises an inner sleeve having a first end and a second end, and having a substantially cylindrical inner diameter and having an outer surface having an outward-facing threaded region, and an outward-facing tapered conical surface located substantially near the first end; and an outer hub having an inner surface with an inward-facing threaded region threadably engagable with the outward-facing threaded region of the inner hub, and an inward-facing tapered conical surface configured to cam along the outward-facing tapered conical surface of the inner hub.

In accordance with another aspect of the present invention, a hub assembly for removable mounting onto a shaft comprises an inner sleeve having a first end and a second end, and having a substantially cylindrical inner diameter and having an outer surface having an outward-facing threaded region, and an outward-facing tapered conical region located substantially near the first end; an outer hub having an inner surface with an inward-facing threaded region threadably engagable with the outward-facing threaded region of the inner hub, and an inward-facing tapered conical surface configured to cam along the outward-facing tapered conical surface of the inner hub; and means for constricting the inner diameter at the first end of the inner hub, by relative rotation of the inner hub with respect to the outer hub.

In accordance with yet another aspect of the present invention, aspect of the present invention, a method for removably mounting a hub assembly onto a shaft, comprises: providing an inner sleeve having a first end and a second end, and having a substantially cylindrical inner diameter and having an outer surface having an outward-facing threaded region, and an outward-facing tapered conical region located substantially near the first end; providing an outer hub having an inner surface with an inward-facing threaded region threadably engagable with the outward-facing threaded region of the inner hub, and an inward-facing tapered conical surface configured to cam along the outward-facing tapered conical surface of the inner hub; and constricting the inner diameter at the first end of the inner hub, upon relative rotation of the inner hub with respect to the outer hub to cause the tapered surface of the inner hub to cam along the tapered surface of the outer hub.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a side view illustrating an impeller and hub assembly mounted onto a rotating shaft.

FIG. 2 is a top view of the impeller and hub assembly of FIG. 1.

FIG. 3 is a cross-sectional view taken through line 3-3 in FIG. 2 and with the shaft and the blade omitted.

DETAILED DESCRIPTION

Figure 5:
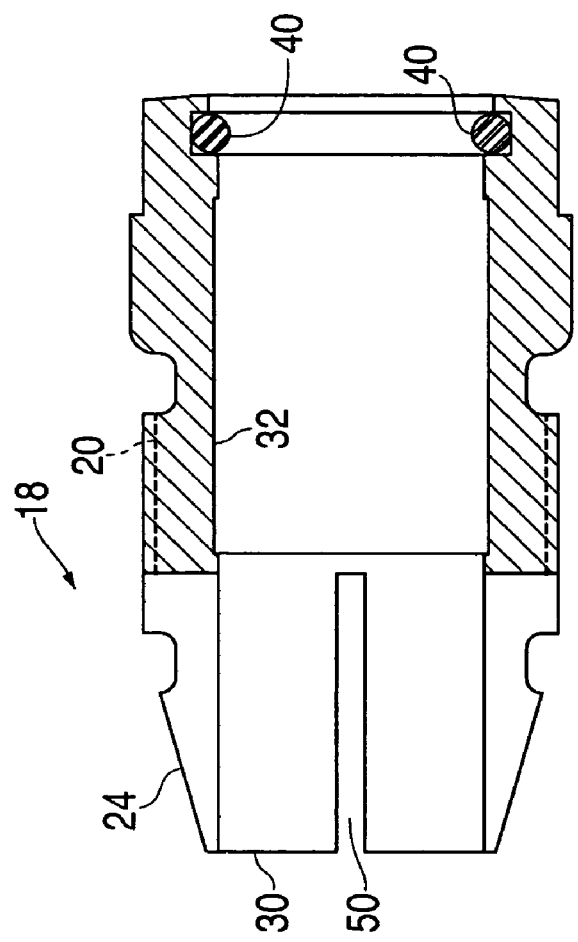
FIG. 5 is a cross-sectional view taken though line 5-5 in FIG. 4.

The foregoing needs are met, to a great extent, by the present invention, wherein in one aspect an apparatus and method is provided that in some embodiments can be easily mounted onto a shaft at the desired axial location, and adjusted to a different axial location and/or removed entirely when desired, and which is easy to clean.

Some preferred embodiments of the invention will now be described with reference to the drawing figures, in which like reference numerals refer to like parts throughout. Turning to FIG. 1, a side view of an impeller hub and blade assembly 10 mounted on to a shaft 12 is depicted.

FIG. 2 is a top view of the impeller hub and blade assembly 10 of FIG. 1 showing the impeller hub and blade assembly 10 being mounted on the shaft 12 and having an outer impeller hub 14 from which radially extend three impeller blades 16. The impeller blades 16 shown are exemplary and it is to be understood that any of a wide variety of impeller blades lengths and shapes can be used, as well as any other number of blade elements themselves.

One of the advantages of the arrangement shown in FIGS. 1-3 is that the removal of the outer impeller hub 14 and the impeller blades 16 can be easily accomplished. For example, returning to FIG. 1, the shaft 12 is shown having an upper portion with a somewhat larger diameter then the lower portion of the shaft. A step change in diameter is occurring here, where a two piece shaft is illustrated. The step change in diameter is located where the two pieces of the shaft are mounted to each other. The lower most end of the shaft 12 (not shown) is typically freely extending into the material to be mixed, or may be retained by some form of steady bearing or stub shaft bearing at the base of the vessel. Accordingly, when the shaft 12 is removed from the vessel, the hub and blade assembly 10 can be slid over the end and onto the shaft in order to facilitate mounting it onto the shaft 12. Once slid over the end, the impeller hub and blade assembly 10 can be slid along the length of the shaft 12 to its desired axial location, and then fastened at that axial location. Conversely, the hub and impeller assembly 10 can be removed from the shaft 12 by sliding it off the free end.

Turning now to FIG. 3, a cross-sectional view taken through line 3-3 of FIG. 2 is illustrated. For simplicity, the impeller blades 16 and the shaft 12 are omitted from FIG. 3. FIG. 3 shows the hub and impeller assembly 10 having two major components. The first major component is an outer impeller hub 14, which has a generally cylindrical hollow body as shown. The impeller blades 16 extend radially from the outer impeller hub 14, and in some of the embodiments be welded directly to the outer impeller hub 14. Of course they also may be permanently or removably attached by other methods.

The other major component is the inner impeller hub sleeve 18. The inner impeller hub sleeve 18 has an externally threaded region 20, which has threads sized to mate with an internally facing threaded region 22 of the outer impeller hub 14. It will be appreciated that by this arrangement, the inner impeller hub sleeve 18 can be rotated with respect to the outer impeller hub 14, or vise versa, so that the threaded connection will move the inner impeller hub sleeve 18 longitudinally with respect to the outer impeller hub 14. For example, rotating the inner impeller hub sleeve 18 in a first direction causes the inner impeller sleeve 18 to translate in the direction shown in the arrow A with respect to the outer impeller hub 14.

The inner impeller hub sleeve 18 has a conical or tapered outer face portion 24 which has a conical taper angle that matches an inward conical or tapered inner face 26 of the outer impeller hub 14. The outer face portion 24 and inner face portion 26 have a sliding, camming relationship.

Rotation of the outer impeller hub 14 with respect to the inner impeller hub sleeve 18 that longitudinally translates the inner hub sleeve 18 in direction with respect to the outer impeller hub 14 will cause some inward deflection of the top end 30 of the inner impeller hub sleeve 18 due to camming sliding contact between the outer face portion 24 and inner face portion 26. That is, the top end 30 of the inner impeller sleeve will have its diameter constricted or reduced to some degree.

The inner impeller hub sleeve 18 has an inner diameter 32, which is sized to be very slightly larger than the outer diameter of the drive shaft 12. The outer impeller hub 28 also has an inner diameter 34 that is also selected to be larger than the shaft diameter. Therefore, it will be appreciated that the components 14 and 18 can be slid over the end of the shaft (whether together with the threads mated or individually as separate components one at a time), and can be slid upward along the length of the shaft, or to the desired axial location. In the embodiment shown in FIG. 1, the shaft 12 has a step provided by the change in shaft direction as described above, so vertical travel during installation is limited by this step. However, the impeller and hub assembly 10 can actually be mounted anywhere along the length of the shaft between the end of the shaft 12 and the step.

Once the impeller and hub assembly 10 is at the desired axial location, it can be locked onto the shaft 12 by rotating the hub 14 and the hub sleeve 18 with respect to each other, to affect the constriction of the inner diameter 30 as has been described above via the threaded portions and the camed faces. In the illustrated preferred embodiment, this tightening can be accomplished by hand. The constriction of the end 30 will cause frictional contact with the shaft 12 that is sufficient to lock the hub assembly 10 so that it rotates together with the shaft 12. The direction of the threads can be selected so that the torque imparted by the shaft 12 and the resistance of the blades 16 is continually providing a tightening force that further serves to tighten the threads and maintain the frictional fit via the constriction of the end 30.

In order to provide for sanitary conditions during operation, three O-ring seals 40, 42 and 44 are provided, each resting within a properly sized O-ring support channel. These three seals 40, 42 and 44 together prevent the material being mixed from entering into threaded areas 20 and 22 as well as the tapered conical areas 26 and 28. They also substantially prevent material from getting in between the hub components 14 and 16 and the shaft 12 itself. The O-rings 40, 42 and 44 can for example be any suitable type of electrometric sealer ring, and for example can be rings made of kalrez (available from Dupont) or peroxide cured EPDM.

The O-rings 40, 42 and 44 are provided for sealing, and not required to provide any substantial locking function. That is, the hub and impeller assembly 10 can be slid up or down the length of the shaft 12 against the frictional resistance, if any, provided by the O-rings 40 and 44. Further, the outer hub 14 and inner hub sleeve 18 can be spun relative to each other relatively easily to overcome the frictional force provided by the O-ring 42.

Figure 4:
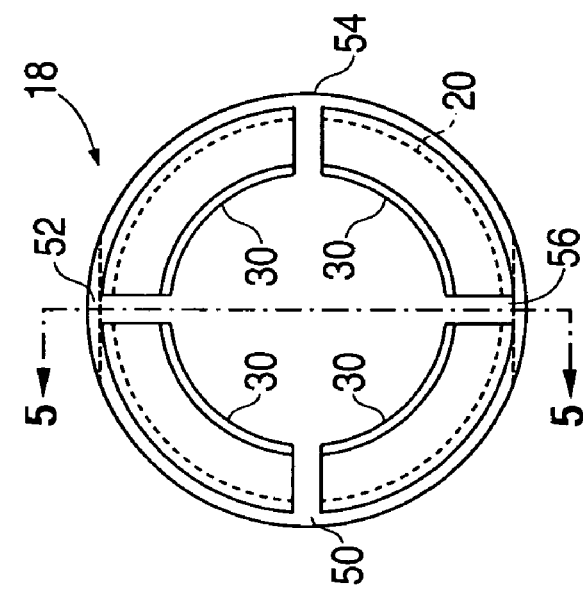
FIG. 4 is an end view of an inner hub sleeve.

Also shown in FIG. 3 is a cross-cut slot 50 which is provided on the inner surface 32 of the inner impeller hub sleeve 18. FIGS. 4 and 5 showing further detail that cross-cut slots 50, 52, 54 and 56 are provided near the end 30 of the inner impeller hub sleeve 18 as shown. The provision of these slots facilitates the inward compression of the top end 30 and the resulting constriction of the diameter of the inner surface 32. Thus, the conical tapered end 30 is able to deform and frictionally grab onto the shaft 12. The provision of the cross-cut slot 50 also allows this deformation to occur within an elastic region, so that the constriction in release at the end occurs in a spring like fashion. Of course, depending on the size and geometry involved, more or less cross-cuts may be provided as appropriate.

It will be appreciated that the illustrated preferred embodiment provides a significant advantage in that it has only two major components and three O-rings. The embodiment does not necessarily require any additional screws, fasteners, c-rings, snap rings or other locking fasteners. This make this preferred embodiment not only economical to manufacturer and simple to use, but also easy to clean, since only two major components and three O-rings need to be cleaned. Also, since the material being mixed during operation is fully or at least substantially prevented from any ingress into the threaded areas 20 and 22 by the O-rings 40 and 44, cleaning of these surfaces is made easier. Further, the preferred embodiment illustrates an example where no keys or threads are substantially exposed to the material, and no external bolt hole or fastener holes are presented to the material.

The impeller and hub assembly 10 may be made of any suitable material including for example metals or plastics. In the case of pharmaceutical, biotechnology, or sanitary food and beverage industries, one preferred material is stainless steel.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents maybe resorted to, falling within the scope of the invention.

What is claimed is:

1. An assembly removably supporting a plurality of impeller blades on a shaft for use within a vessel containing material to be mixed, comprising:
   a one-piece inner sleeve, being slidable over and connected to the shaft, comprising
      a first end and a second end,
      a substantially cylindrical inner surface,
      an outer surface having an outward-facing threaded region between the first and second ends and a slotted, outward-facing tapered conical surface located substantially near the second end, and
      an inward facing first O-ring receiving groove located adjacent the shaft on the inner surface at the first end of the sleeve;
   a one-piece outer hub having the plurality of impeller blades mounted to an outer surface of the hub, being slidable over and connected to the shaft, comprising
      a first end and a second end,
      an inner surface with an inward-facing threaded region between the first and second ends threadably engagable with the outward-facing threaded region of the inner sleeve and an inward-facing tapered conical surface substantially near the second end configured to cam along the slotted, outward-facing tapered conical surface of the inner sleeve so that tightening the outer hub causes the slotted portion of the inner sleeve to frictionally lock onto the shaft at an adjustable location on the shaft,
      an inward facing second O-ring receiving groove on an inner surface of the outer hub adjacent the first end of the inner sleeve, and
      an inward facing third O-ring receiving groove on the inner surface of the outer hub adjacent the shaft at the second end of the outer hub;
   a first O-ring received in the first O-ring receiving groove that provides a seal between the inner sleeve and the shaft;
   a second O-ring received in the second O-ring groove, that provides a seal between the inner sleeve and the outer hub;
   a third O-ring received in the third O-ring receiving groove, that provides a seal between the outer hub and the shaft; and
   wherein, upon securement of the sleeve and hub to the shaft, the seals isolate the internal sleeve to hub connection from the material to be mixed.

2. An assembly according to claim 1, wherein the impellers are welded to the outer hub.

3. An assembly according to claim 1, wherein relative rotation of the inner sleeve with respect to the outer hub causes the tapered surface of the inner sleeve to cam along the tapered surface of the outer hub to cause a constriction in the inner diameter at the first end of the inner hub.

4. A method of removably supporting a plurality of impeller blades on a shaft for use within a vessel containing material to be mixed, comprising:
   providing a one-piece inner sleeve, being slidable over and connected to the shaft, comprising
      a first end and a second end,
      a substantially cylindrical inner surface,
      an outer surface having an outward-facing threaded region between the first and second ends and a slotted, outward-facing tapered conical surface located substantially near the second end, and
      an inward facing first O-ring receiving groove located adjacent the shaft on the inner surface at the first end of the sleeve;
   providing a one-piece outer hub having the plurality of impeller blades mounted to an outer surface of the hub, being slidable over and connected to the shaft, comprising
      a first end and a second end,
      an inner surface with an inward-facing threaded region between the first and second ends threadably engagable with the outward-facing threaded region of the inner sleeve and an inward-facing tapered conical surface substantially near the second end configured to cam along the slotted, outward-facing tapered conical surface of the inner sleeve, an inward facing second O-ring receiving groove on an inner surface of the outer hub adjacent the first end of the inner sleeve, and an inward facing third O-ring receiving groove on the inner surface of the outer hub adjacent the shaft at the second end of the outer hub;

providing a first O-ring received in the first O-ring receiving groove that provides a seal between the inner sleeve and the shaft;

providing a second O-ring received in the second O-ring groove, that provides a seal between the inner sleeve and the outer hub;

providing a third O-ring received in the third O-ring receiving groove, that provides a seal between the outer hub and the shaft; and securing the sleeve and hub to the shaft by constricting the inner diameter at the second end of the inner sleeve, by relative rotation of the inner hub with respect to the outer hub causing the slotted portion of the inner sleeve to frictionally lock onto the shaft at an adjustable location on the shaft, such that the seals isolate the internal sleeve to hub connection from the material to be mixed.

5. A method according to claim 4, wherein the impellers are welded to the outer hub.

6. A method according to claim 4, further comprising sliding the lower sleeve and outer hub along at least a part of the length of the shaft.

\* \* \* \* \*